United States Patent
Sharma

(10) Patent No.: US 10,423,586 B2
(45) Date of Patent: Sep. 24, 2019

(54) METHOD AND SYSTEM FOR SYNCHRONIZATION OF RELATIONAL DATABASE MANAGEMENT SYSTEM TO NON-STRUCTURED QUERY LANGUAGE DATABASE

(71) Applicant: Wipro Limited, Bangalore (IN)

(72) Inventor: Mayank Sharma, Bangalore (IN)

(73) Assignee: Wipro Limited, Bangalore (IN)

( * ) Notice: Subject to any disclaimer, the term of this patent is extended or adjusted under 35 U.S.C. 154(b) by 848 days.

(21) Appl. No.: 15/080,147

(22) Filed: Mar. 24, 2016

(65) Prior Publication Data

US 2017/0270137 A1 Sep. 21, 2017

(30) Foreign Application Priority Data

Mar. 17, 2016 (IN) .............................. 201641009400

(51) Int. Cl.
*G06F 16/178* (2019.01)
*G06F 16/28* (2019.01)
*H04L 29/08* (2006.01)
*G06F 16/903* (2019.01)

(52) U.S. Cl.
CPC ........ *G06F 16/1794* (2019.01); *G06F 16/178* (2019.01); *G06F 16/284* (2019.01); *G06F 16/903* (2019.01); *H04L 67/1095* (2013.01)

(58) Field of Classification Search
CPC ............. G06F 16/24542; G06F 16/284; G06F 16/1794
See application file for complete search history.

(56) References Cited

U.S. PATENT DOCUMENTS

| | | |
|---|---|---|
| 2008/0071730 A1* | 3/2008 | Barcia ................... G06F 16/284 |
| 2012/0317155 A1 | 12/2012 | Ogasawara et al. |
| 2013/0024484 A1 | 1/2013 | Banerjee et al. |
| 2015/0142736 A1 | 5/2015 | Bruce et al. |
| 2015/0142846 A1 | 5/2015 | Levine et al. |
| 2015/0169686 A1* | 6/2015 | Elias et al. ........ G06F 16/24542 707/718 |

FOREIGN PATENT DOCUMENTS

CN 102982130 A 3/2013

* cited by examiner

*Primary Examiner* — Etienne P Leroux
(74) *Attorney, Agent, or Firm* — Pepper Hamilton LLP

(57) ABSTRACT

A method and system for synchronization of Relational Database Management System (RDBMS) to non-Structured Query Language (noSQL) database receives a user request and associated predefined business logic from a user device for retrieving one or more transactional data and synchronizes the RDBMS to the noSQL database based on the predefined business logic. The database synchronization system segregates the predefined business logic into one or more processing divisions and assigning the one or more processing divisions to the RDBMS and the noSQL database. Further, the noSQL database retrieves data related to one or more elements of one or more tables related to the one or more transactional data from the RDBMS. Thereafter, the noSQL database transforms the retrieved data and provide to the database synchronization system. Finally, database synchronization system provides transformed data received from the noSQL database to the user device.

15 Claims, 5 Drawing Sheets

METHOD AND SYSTEM FOR SYNCHRONIZATION OF RELATIONAL DATABASE MANAGEMENT SYSTEM TO NON-STRUCTURED QUERY LANGUAGE DATABASE

This application claims the benefit of Indian Patent Application Serial No. 201641009400, filed Mar. 17, 2016, which is hereby incorporated by reference in its entirety.

FIELD

The present subject matter is related in general to database management systems, and more particularly, but not exclusively to a method and a system for synchronization of Relational Database Management System (RDBMS) to non-Structured Query Language (noSQL) database.

BACKGROUND

Generally, enterprises maintain traditional databases such as relational databases for their users/customers. Most of the relational databases store a large amount of data in a tabular format. As an example, data may be related to transaction processes of customers in a banking enterprise. The data continuously grows over time in the relational databases and builds up to a large quantity. As size of the relational databases increase, performance of the relational database becomes a major concern. More problems are faced by the users using current technologies, such as mobile based technologies, that may require quick response, high speed data processing and analytical reporting. Also, accessing/retrieving data from a plurality of tables in the relational databases becomes difficult because of the increasing size of the relational databases. In spite of these issues, the enterprises do not prefer changing from relational databases to newer technologies as the relational databases are the legacy applications and contain data of high importance.

Currently, a hybrid data management system is provided wherein the hybrid data management system comprises a first data management system (e.g., NoSQL database) in sync with at least one additional connected data management system (e.g., large data store). The system further comprises data management logic, for receiving a read request from external application or a user, retrieving metadata and reading data object associated with the metadata. But the current method does not distribute the processing among the hybrid databases based on predefined management logic for fast and easy retrieval of data.

Therefore, there is need for a solution for configuring hybrid databases that helps in faster data retrieval for applications at users' devices, especially for mobile applications without impacting or changing the current application environment.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a system for synchronization of Relational Database Management System (RDBMS) to non-Structured Query Language (noSQL) database. A database synchronization system receives a predefined business logic associated with a user request. The predefined business logic is segregated and one or more actions to be performed based on the segregated predefined business logic are assigned to the respective databases. The segregation helps in distributing the processing overhead and workload between the RDBMS and the noSQL database which in turn helps in faster retrieval of data. Also, since the user device is in contact with the noSQL database, the retrieved data is directly provided to the user device without any Object-Relation Mapping (ORM) conversion. Thus, a lot of time is reduced in retrieval of the data based on user's request and also a new application is used in combination with the existing legacy application and customer environment without any changes.

Accordingly, the present disclosure comprises a method for synchronization of Relational Database Management System (RDBMS) to non-Structured Query Language (noSQL) database. The method comprises receiving, by a database synchronization system, a user request and associated predefined business logic from a user device for retrieving one or more transactional data. The one or more transactional data is stored in the RDBMS. Thereafter, the database synchronization system synchronizes the RDBMS to the noSQL database based on the predefined business logic. Further, the database synchronization system segregates the predefined business logic into one or more processing divisions and assigning the one or more processing divisions to the RDBMS and the noSQL database. The segregation is based on one or more actions to be performed based on the predefined business logic. Upon segregating the predefined business logic, the database synchronization system prompts the noSQL database to retrieve data related to one or more elements of one or more tables related to the one or more transactional data from the RDBMS. The RDBMS performs the one or more actions associated with the one or more processing divisions assigned to the RDBMS on the data related to the one or more elements of the one or more tables. Thereafter, the database synchronization system receives a transformed data from the noSQL database. The transformed data is formed by the noSQL database by performing the one or more actions associated with the one or more processing divisions assigned to the noSQL database on the retrieved data related to the one or more elements of the one or more tables. Finally, the database synchronization system provides the transformed data to the user device.

Further, the present disclosure comprises a database synchronization system for synchronization of Relational Database Management System (RDBMS) to non-Structured Query Language (noSQL) database. The database synchronization system comprises a processor and a memory communicatively coupled to the processor. The memory stores the processor-executable instructions, which, on execution, causes the processor to receive a user request and associated predefined business logic from a user device for retrieving one or more transactional data. The one or more transactional data is stored in the RDBMS. Upon receiving the request and the associated predefined business logic, the processor synchronizes the RDBMS to the noSQL database based on the predefined business logic. Further, the processor segregates the predefined business logic into one or more processing divisions and assigning the one or more processing divisions to the RDBMS and the noSQL database. The segregation is based on one or more actions to be performed based on the predefined business logic. Upon segregating the business logic, the processor prompts the noSQL database to retrieve data related to one or more elements of one or more tables related to the one or more transactional data from the RDBMS. The RDBMS performs the one or more actions associated with the one or more processing divisions assigned to the RDBMS on the data related to the one or more elements of the one or more tables. Further, the processor receives a transformed data from the noSQL database. The transformed data is formed by the noSQL database by performing the one or more actions associated with the one or more processing divisions assigned to the noSQL database on the retrieved data related to the one or more elements of the one or more tables. Finally, the processor provides the transformed data to the user device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
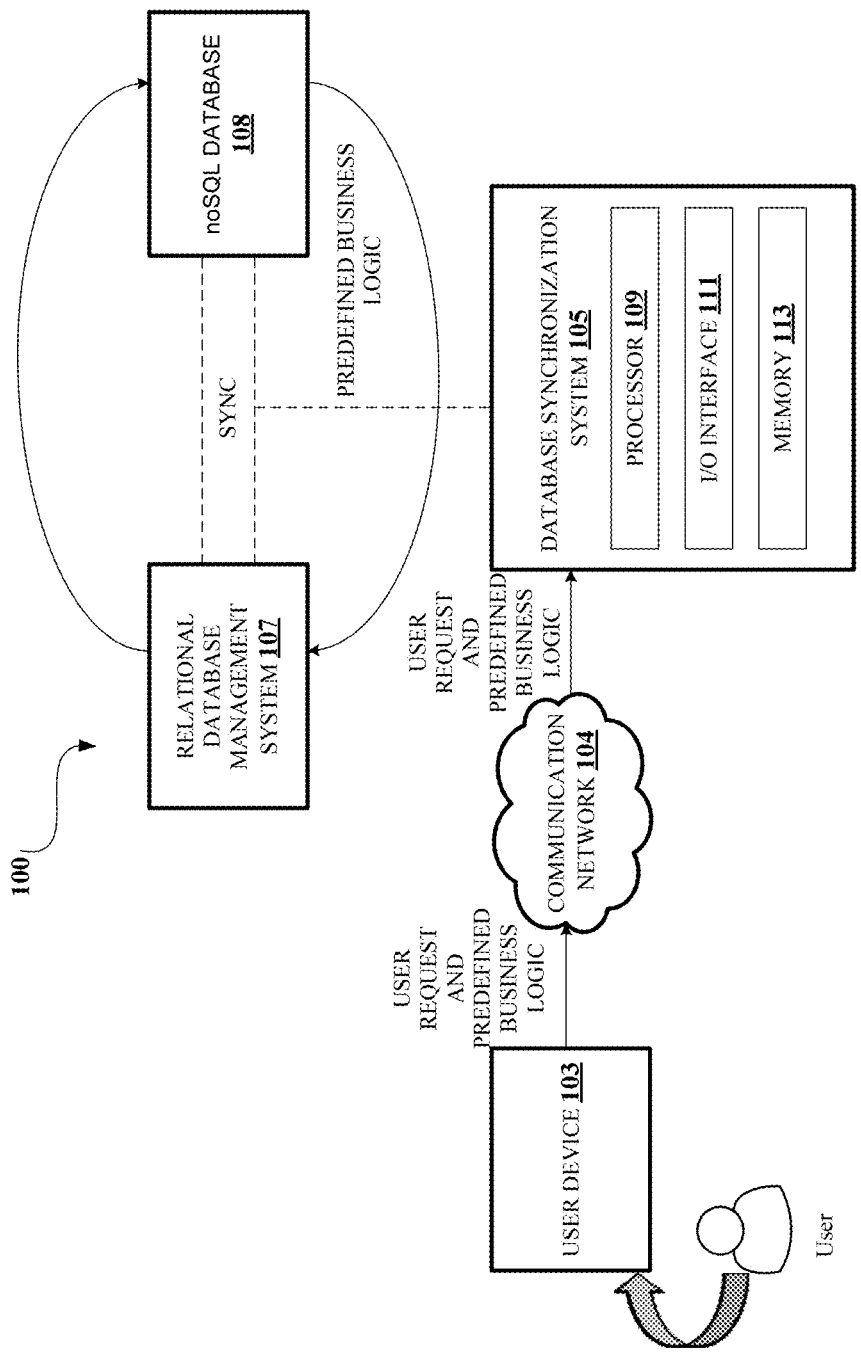
FIG. 1A shows an exemplary architecture for synchronization of Relational Database Management System (RDBMS) to non-Structured Query Language (noSQL) database in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure comprises a method and a system or apparatus for synchronization of Relational Database Management System (RDBMS) to non-Structured Query Language (noSQL) database. The method comprises receiving, by a database synchronization system, also known in this example as a database synchronization computing apparatus, a user request and associated predefined business logic from a user device for retrieving one or more transactional data. The one or more transactional data is stored in the RDBMS. Thereafter, the database synchronization system synchronizes the RDBMS to the noSQL database based on the predefined business logic. Further, the database synchronization system segregates the predefined business logic into one or more processing divisions and assigning the one or more processing divisions to the RDBMS and the noSQL database. The segregation is based on one or more actions to be performed based on the predefined business logic. Upon segregating the predefined business logic, the database synchronization system prompts the noSQL database to retrieve data related to one or more elements of one or more tables related to the one or more transactional data from the RDBMS. The RDBMS performs the one or more actions associated with the one or more processing divisions assigned to the RDBMS on the data related to the one or more elements of the one or more tables. Thereafter, the database synchronization system receives a transformed data from the noSQL database. The transformed data is formed by the noSQL database by performing the one or more actions associated with the one or more processing divisions assigned to the noSQL database on the retrieved data related to the one or more elements of the one or more tables. Finally, the database synchronization system provides the transformed data to the user device.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A shows an exemplary architecture for synchronization of Relational Database Management System (RDBMS) to non-Structured Query Language (noSQL) database in accordance with an embodiment of the present disclosure.

The architecture 100 comprises a user device 103, a communication network 104, a database synchronization system 105, a Relational Database Management System (RDBMS) 107 and a non-Structured Query Language (noSQL) database 108. As an example, the user device 103 may include, but not limited to, a mobile, a laptop, a tablet and a desktop. The communication network 104 may include, but not limited to, a wired communication network, a wireless communication network and a suitable combination thereof. As an example, the RDBMS 107 may include, but not limited to, Oracle, MySQL, SQL server and PostgreSQL. As an example, the noSQL database 108 may include, but not limited to MongoDB (Mongo Database), Lotusnotes, RethinkDB (Rethink Database) and CouchDB (Couch Database).

Figure 1B:
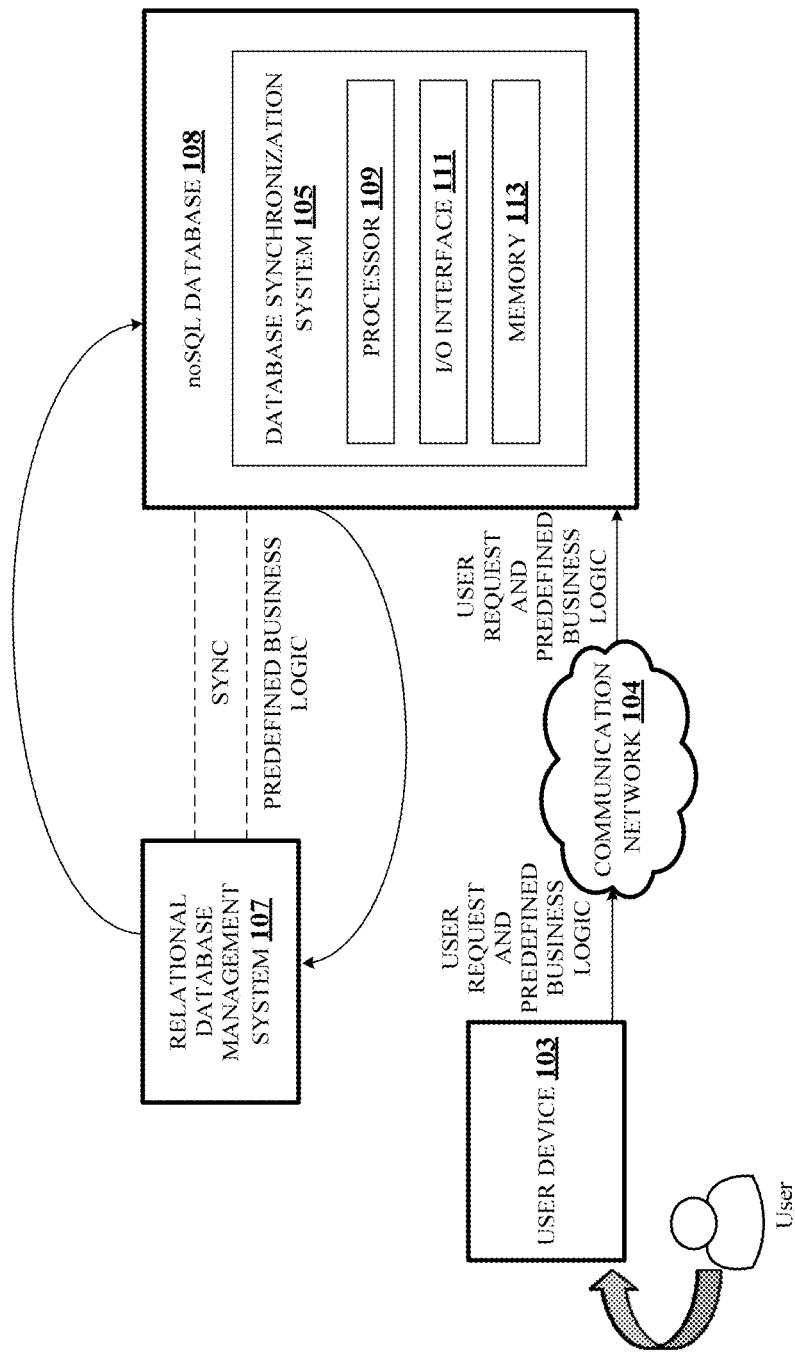
FIG. 1B shows an exemplary architecture of another embodiment for synchronization of Relational Database Management System (RDBMS) to non-Structured Query Language (noSQL) database in accordance with another embodiment of the present disclosure.

A user of the user device 103 sends a request to the database synchronization system 105 through the communication network 104. As an example, the user may include, but not limited to, a customer, a shareholder, a manager and a developer. The user request is for retrieving one or more transactional data. In an embodiment, the one or more transactional data is stored in the RDBMS 107. In an embodiment, the RDBMS 107 may be running on Z environment or a distributed environment. The request/user request is associated with predefined business logic by the database synchronization system 105. As an example, the user may send a user request to retrieve the current account balance of the user's account using a bank website. The predefined business logic associated with the user's request to retrieve the current account balance may be "retrieve the column "current account balance"" from the table stored in the RDBMS 107. In one embodiment, the database synchronization system 105 is present outside the noSQL database 108 as shown in FIG. 1A. In another embodiment, the database synchronization system 105 maybe present within the noSQL database 108 as shown in FIG. 1B.

The database synchronization system 105 comprises a processor 109, an I/O interface 111 and a memory 113. The I/O interface 111 is configured to receive the user request from the user device 103 via the communication network 104. The memory 113 is communicatively combined to the processor 109. The processor 109 synchronizes the RDBMS 107 to noSQL database 108 based on the predefined business logic. Since the synchronization of the RDBMS 107 and the noSQL database 108 is based on the predefined business logic, complete synchronization of the RDBMS 107 to the noSQL database 108 is not performed. Only a part of the RDBMS 107 associated with the predefined business logic is synchronized with the noSQL database 108 since the RDBMS 107 is a legacy database and handles large amounts of transaction workload. Also, data in the RDBMS 107 may keep getting updated, inserted or deleted as a result of which complete synchronization may be a complex process and time consuming. Based on frequency at which the data in the RDBMS 107 is getting updated, inserted or deleted, the noSQL database 108 may fail to be in sync with the RDBMS 107. Therefore, to maintain the RDBMS 107 and the noSQL database 108 in sync, synchronization of the RDBMS 107 to the noSQL database 108 may be performed at real time or the synchronization may be time bound. The processor 109 captures the changes occurred in RDBMS 107 and updates the noSQL database 108 based on the captured changes.

Upon synchronizing the RDBMS 107 to the noSQL database 108, the processor 109 segregates the predefined business logic into one or more processing divisions. The one or more processing divisions are the divisions generated for performing processing steps on the one or more transactional data using one or more actions. In an embodiment, the processor 109 learns the one or more actions to be performed on the one or more transactional data upon receiving the user request. As an example, the one or more actions may include, but not limited to, at least one of cleansing, validation, complex calculations, normalization, consolidation, grouping, filtering or conversion performed on the data related to one or more elements of the one or more tables. Upon segregating the predefined business logic into one or more processing divisions, the processor 109 assigns the one or more processing divisions to the RDBMS 107 and the noSQL database 108. In an embodiment, segregating and assigning some part of the one or more processing divisions to RDBMS 107 and remaining part to the noSQL database 108 is configurable. As an example, the one or more processing divisions including the one or more actions like cleansing, complex calculations, validation and normalization may be assigned to the RDBMS 107 to eliminate the I/O overload through the communication network 104. As an example, the rest of the one or more processing divisions including the one or more actions like consolidating, grouping, filtering and conversion may be assigned to the noSQL database 108.

Upon assigning the one or more processing divisions, the processor 109, prompts the noSQL database 108 to retrieve the one or more transactional data from the RDBMS 107. The noSQL database 108 may select only data related to one or more elements of one or more tables related to the one or more transactional data from the RDBMS 107 for retrieval. The RDBMS 107 performs the one or more actions associated with the one or more processing divisions assigned to the RDBMS 107 on the data related to the one or more elements of the one or more tables before retrieval by the noSQL database 108. In an embodiment, the RDBMS 107 may use stored procedures to perform the one or more actions. The noSQL database 108 retrieves the data related to the one or more elements of the one or more tables on which the RDBMS 107 has performed the one or more actions, using a predefined Application Program Interface (API). As an example, the predefined API may be a REST API. The REST API provides quick development cycles for the user as the REST API retrieves only the data related to one or more elements of the one or more tables based on the predefined business logic.

Upon retrieving the data related to one or more elements of the one or more tables on which the RDBMS 107 has performed the one or more actions, the noSQL database 108 transforms the retrieved data. The noSQL database 108 transforms the retrieved data by performing the one or more actions associated with the one or more processing divisions assigned to the noSQL database 108. Upon transforming the retrieved data, the transformed data is sent to the database synchronization system 105 by the noSQL database 108. The I/O interface 111 receives the transformed data from the noSQL database 108. The transformed data is finally provided to the user device 103 as a response to the user request received.

Scenario-1

As an example, consider a scenario where an enterprise has branches in 5 cities of India. The 5 cities where the enterprise has its branches are Bangalore, Hyderabad, Calcutta, Chennai and Mumbai. The user sends the request using the user device 103. The user request is to get a consolidated report indicating average salary of all employees belonging to Computer Science (CS) department of the enterprise for Bangalore and Chennai branches and total amount spent for employees' salary for both the branches. The user request also comprises a request for individual reports of Bangalore and Chennai branches indicating the average salaries of the employees' belonging to the CS department. In an embodiment, all the departments available in the enterprise are CS, Electronics and Telecommunication (EC) and Telecommunication (TC). The predefined business logic associated with the user request may be "determine average salary of employees report for Bangalore branch: determine average salary of employees report for Chennai branch: consolidate employees report for Bangalore and Chennai branches: determine average salary of employees' report of both Bangalore: determine total amount spent on employees salary in both Bangalore and Chennai branches together and present the data to the user". The predefined business logic is sent along with the user request to the database synchronization system 105.

The Employee (also referred as Emp) table for Bangalore branch as stored in the RDBMS 107 is shown in the below Table 1.

TABLE 1

| Emp_id | Emp_Firstname | Emp_lastname | Emp_age | Emp_salary | Emp_dept | Emp_sex |
|---|---|---|---|---|---|---|
| 1001 | John | Ray | 24 | Rs.27000 | CS | Male |
| 1002 | Ross | Geller | 35 | Rs.35000 | EC | Male |
| 1003 | Joseph | Michael | 22 | Rs.23000 | TC | Male |
| 1004 | Ankit | Sharma | 22 | Rs.23000 | TC | Male |
| 1005 | Abhinaya | Kumar | 40 | Rs.50000 | CS | Female |
| 1006 | Sailaja | Gowda | 37 | Rs.45000 | CS | Female |
| 1007 | Amit | Medi | 36 | Rs.43000 | EC | Male |

The Employee (also referred as Emp) table for Chennai branch as stored in the RDBMS 107 is shown in the below Table 2.

TABLE 2

| Emp_id | Emp_Firstname | Emp_lastname | Emp_age | Emp_salary | Emp_dept | Emp_sex |
|---|---|---|---|---|---|---|
| 2001 | Johnny | Rust | 50 | Rs.90000 | CS | Male |
| 2002 | Monica | Geller | 35 | Rs.40000 | CS | Female |
| 2003 | Manpreet | Singh | 25 | Rs.25000 | CS | Male |
| 2004 | Paramjeet | Singh | 28 | Rs.33000 | TC | Female |
| 2005 | Abhi | Sharma | 43 | Rs.65000 | CS | Male |
| 2006 | Sai | Dilip | 25 | Rs.25000 | EC | Male |
| 2007 | Amitha | Shekar | 30 | Rs.33000 | EC | Female |

As the processor 109 synchronizes the RDBMS 107 and the noSQL database 108 based on the predefined business logic i.e. only the data related to the user request may be synchronized using the predefined business logic. Therefore, the processor 109 synchronizes only the Table 1 and Table 2 present in the RDBMS 107 with the noSQL database 108 based on the predefined business logic. The predefined business logic is segregated into the one or more processing divisions based on the one or more actions to be performed based on the predefined business logic. Further, the one or more processing divisions are assigned to the RDBMS 107 and the noSQL database 108. In this scenario, one of the one or more processing divisions of the predefined business logic comprising "determine average salary of employees report for Bangalore branch: determine average salary of employees report for Chennai branch" is assigned to the RDBMS 107. The rest of the one or more processing divisions comprising "consolidate employees report for Bangalore and Chennai branches: determine average salary of employees' report of both Bangalore: determine total amount spent on employees' salary in both Bangalore and Chennai branches together and present the data to the user" is assigned to the noSQL database 108. Thereafter, the database synchronization system 105 prompts the noSQL database 108 to retrieve the data related to one or more elements of the tables Table 1 and Table 2. The noSQL database 108 selects the data related to the one or more elements of the Table 1. The selected one or more elements are as shown in the below Table 3.

TABLE 3

| Emp_salary | Emp_dept |
|---|---|
| Rs.27000 | CS |
| Rs.50000 | CS |
| Rs.45000 | CS |

The noSQL database 108 selects the data related to the one or more elements of the Table 2. The selected one or more elements are as shown in the below Table 4.

TABLE 4

| Emp_salary | Emp_dept |
|---|---|
| Rs.90000 | CS |
| Rs.40000 | CS |
| Rs.25000 | CS |
| Rs.65000 | CS |

The RDBMS 107 performs the mathematical calculations and determines the average salary of Bangalore branch based on the employee salary shown in Table 3. The average employee salary of the Bangalore branch obtained upon performing the mathematical calculations is as shown in the below Table 5.

TABLE 5

| Average_Emp_salary_Bangalore |
|---|
| Rs.40666.67 |

The RDBMS 107 performs the mathematical calculations to determine the average salary of Chennai branch based on the employee salary shown in Table 4. The average employee salary of the Chennai branch obtained upon performing the mathematical calculations is as shown in the below Table 6.

TABLE 6

| Average_Emp_salary_Chennai |
|---|
| Rs.55000 |

Further, the RDBMS 107 performs the mathematical calculations to determine average salary of the employees of the CS department of both Bangalore and Chennai branches. The average employee salary of the Bangalore and Chennai branches together, obtained upon performing the mathematical calculations is as shown in the below Table 7.

TABLE 7

| Average_Emp_salary_Bangalore_Chennai |
|---|
| Rs.48857.14 |

Finally, the RDBMS 107 performs the mathematical calculations to determine total amount spent on employees' salary in both Bangalore and Chennai branches together. The total amount of the Bangalore and Chennai branches together, obtained upon performing the mathematical calculations is as shown in the below Table 8.

TABLE 8

| Total_amount_Bangalore_Chennai |
|---|
| Rs.3,42,000 |

Upon performing the mathematical calculations, the RDBMS 107 allows the retrieval of Table 3, Table 4, Table 5, Table 6, Table 7 and Table 8 by the noSQL database 108.

Upon retrieving the Table 5 and Table 6, noSQL database 108 first performs consolidation of the reports of the Bangalore and the Chennai branch. Bangalore_Chennai_Consolidated_Emp_report: [

```
{
    Emp_salary: "Rs.27000"
    Emp_dept: "CS"
}
{
    Emp_salary: "Rs.50000"
    Emp_dept: "CS"
}
{
    Emp_salary: "Rs.45000"
    Emp_dept: "CS"
}
{
    Emp_salary: "Rs.90000"
    Emp_dept: "CS"
}
{
    Emp_salary: "Rs.40000"
    Emp_dept: "CS"
}
{
    Emp_salary: "Rs.25000"
    Emp_dept: "CS"
}
{
    Emp_salary: "Rs.65000"
    Emp_dept: "CS"
}
{
    Average_Emp_salary_Bangalore: "Rs.48857.14"
}
{
    Total_amount_Bangalore_Chennai: "Rs.3, 42,000"
}
]
```

Upon consolidating the reports of Bangalore and Chennai branches, the noSQL database 108 provides the information to the user of the user device 103 as shown below:

Average salary of CS employees in Bangalore branch: Rs.40666.67.

Average salary of CS employees in Bangalore branch: Rs.55000.

Average salary of CS employees in Bangalore and Chennai branch: Rs.48857.14.

Total amount spent on salary of CS employees in Bangalore and Chennai branch: Rs.3, 42,000.

Scenario-2

As an example, consider another scenario where the user may request for $95^{th}$ percentile of salaries of all the employees for both Bangalore and Chennai branches. The predefined business logic associated with the user request may be "determine $95^{th}$ percentile of salaries for Bangalore and Chennai branches". The predefined business logic is sent along with the user request to the database synchronization system 105.

Based on the predefined business logic, the RDBMS 107 determines the $95^{th}$ percentile of the salaries of all the employees for both Bangalore and Chennai branches.

To calculate the $95^{th}$ percentile, the RDBMS 107 first combines the elements of Table 1 and Table 2 and sorts the elements in descending order of the employees' salary as shown in the below Table 9.

TABLE 9

| Emp_id | Emp_Firstname | Emp_lastname | Emp_age | Emp_salary |
|---|---|---|---|---|
| 2001 | Johnny | Rust | 50 | Rs.90000 |
| 2005 | Abhi | Sharma | 43 | Rs.65000 |
| 1005 | Abhinaya | Kumar | 40 | Rs.50000 |
| 1006 | Sailaja | Gowda | 37 | Rs.45000 |
| 1007 | Amit | Medi | 36 | Rs.43000 |
| 2002 | Monica | Geller | 35 | Rs.40000 |
| 1002 | Ross | Geller | 35 | Rs.35000 |
| 2007 | Amitha | Shekar | 30 | Rs.33000 |
| 2004 | Paramjeet | Singh | 28 | Rs.33000 |
| 1001 | John | Ray | 24 | Rs.27000 |
| 2006 | Sai | Dilip | 25 | Rs.25000 |
| 2003 | Manpreet | Singh | 25 | Rs.25000 |
| 1004 | Ankit | Sharma | 22 | Rs.23000 |
| 1003 | Joseph | Michael | 22 | Rs.23000 |

The RDBMS 107 uses the Equation 1 as shown below to determine the $95^{th}$ percentile.

$$95^{th} \text{ percentile value} = ((95/100) * n) \quad \text{Equation 1}$$

In the above Equation 1, n indicates the total number of employees from the Bangalore and the Chennai branches. Since there are 14 elements in the scenario, n is 14. The values are substituted to the Equation 1 and $95^{th}$ percentile is obtained as shown below:

$$95^{th} \text{ percentile value} = ((95/100) * 14) = 13.3 = 13$$

Therefore, the RDBMS selects the 13$^{th}$ value from list of the elements of Table 1 and Table 2 that have been sorted in the descending order of the employees' salary as shown in the below Table 10. The 13$^{th}$ value is second largest value in the list.

TABLE 10

95$^{th}$ percentile on employee Salary

Rs.65000

The noSQL database 108 retrieves and stores the 95$^{th}$ percentile value of all the employees of the Bangalore and the Chennai branch as shown below.

Bangalore__Chennai__95$^{th}$ percentile on employee's Salary: [
{
    95$^{th}$ percentile: Rs.65000
}
]

Further, the noSQL database 108 represents the 95$^{th}$ percentile value of all the employees of the Bangalore and the Chennai branch to the user as shown below.

The 95$^{th}$ percentile of employees' salary from Bangalore and Chennai branch: Rs.65000

Figure 2:
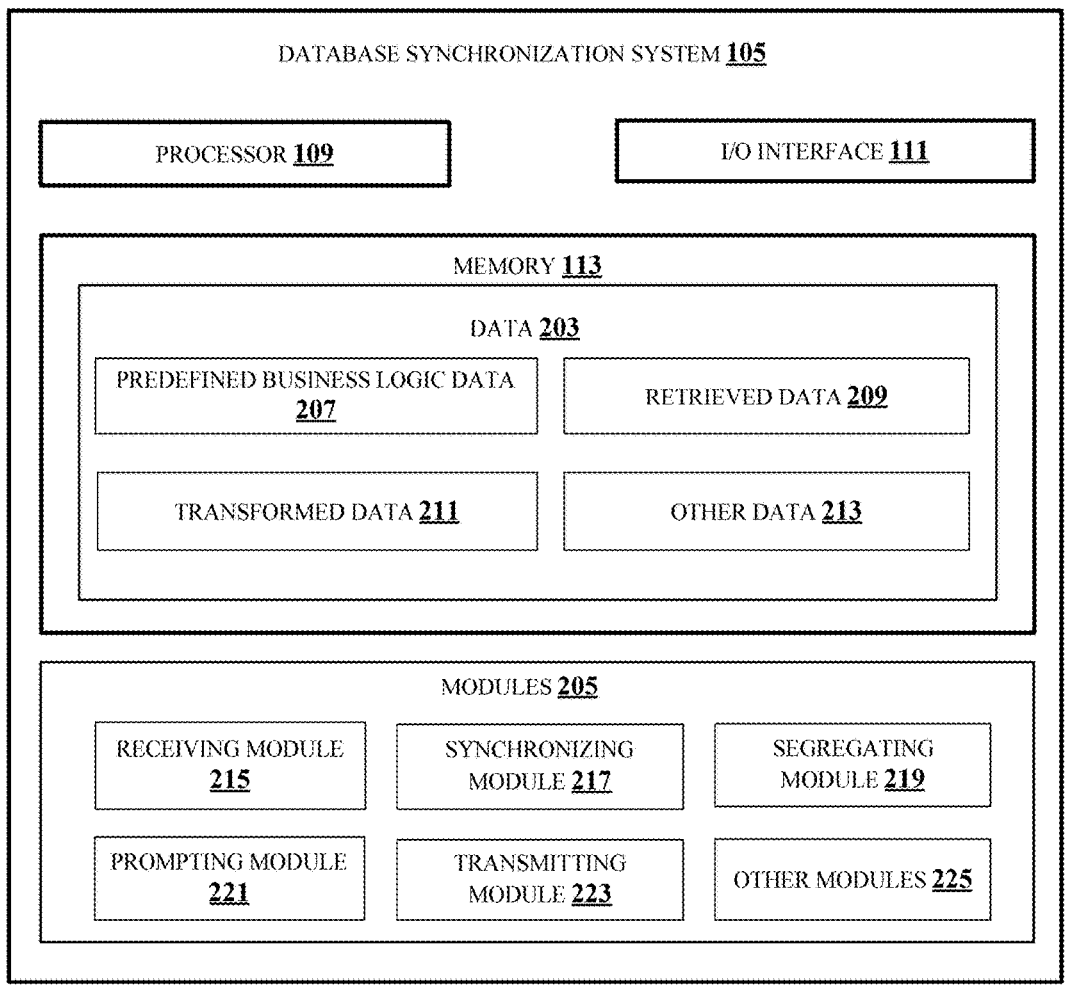
FIG. 2 shows a detailed block diagram of a database synchronization system for synchronization of Relational Database Management System (RDBMS) to non-Structured Query Language (noSQL) database in accordance with some embodiments of the present disclosure.

FIG. 2 shows a detailed block diagram of a database synchronization system for synchronization of Relational Database Management System (RDBMS) to non-Structured Query Language (noSQL) database in accordance with some embodiments of the present disclosure.

In one implementation, an I/O interface 111 configured in the database synchronization system 105 receives data 203 from a user device 103. As an example, the data 203 is stored in a memory 111 configured in the database synchronization system 105 as shown in FIG. 2. In one embodiment, data 203 includes predefined business logic data 207, retrieved data 209, transformed data 211 and other data 213.

In the illustrated FIG. 2, modules 205 are described herein in detail.

In one embodiment, the data 203 may be stored in the memory 113 in the form of various data structures. Additionally, the aforementioned data can be organized using data models, such as relational or hierarchical data models. The other data 213 may store data, including temporary data and temporary files, generated by modules 205 for performing the various functions of the database synchronization system 105.

In an embodiment, the predefined business logic data 207 comprises predefined business logic. Each user request has a predefined business logic associated with it. When a user sends a user request for one or more transactional data, the predefined business logic associated with the user request is provided to the database synchronization system 105 along with the user request.

In an embodiment, the retrieved data 209 comprises the data retrieved by the noSQL database 108 from the Relational Database Management System (RDBMS) 107. The retrieved data 209 from the RDBMS 107 by the noSQL database 108 comprises data related to one or more elements of the one or more tables related to the one or more transactional data. The retrieved data 209 is processed by the RDBMS 107 based on one or more processing divisions assigned to the RDBMS 107.

In an embodiment, the transformed data 211 comprises the data transformed by the noSQL database 108. The transformed data 211 is formed by processing the retrieved data 209 by the noSQL database 108, based on one or more processing divisions assigned to the noSQL database 108.

In an embodiment, the data 203 stored in the memory 113 is processed by the modules 205 of the database synchronization system 105. The modules 205 may be stored within the memory 113. In an example, the modules 205, communicatively coupled to a processor 109 configured in the database synchronization system 105, may also be present outside the memory 113 as shown in FIG. 2 and implemented as hardware. As used herein, the term module may refers to an application specific integrated circuit (ASIC), an electronic circuit, a processor 109 (shared, dedicated, or group) and memory 113 that execute one or more software or firmware programs, a combinational logic circuit, and/or other suitable components that provide the described functionality.

In an embodiment, the modules 205 may include, for example, a receiving module 215, a synchronizing module 217, a segregating module 219, a prompting module 221, a transmitting module 223 and other modules 225. The other modules 225 may be used to perform various miscellaneous functionalities of the database synchronization system 105. It will be appreciated that such aforementioned modules 205 may be represented as a single module or a combination of different modules.

In an embodiment, the receiving module 215 receives the user request from the user device 103. The user request comprises a request for retrieving one or more transactional data. The processor 109 also receives the predefined business logic associated with the user request.

In an embodiment, the synchronizing module 217 synchronizes the RDBMS 107 and the noSQL database 108 based on the predefined business logic. The complete synchronization of the RDBMS 107 to the noSQL database 108 is not only a part of the RDBMS 107 associated with the predefined business logic is synchronized with the noSQL database 108.

In an embodiment, the segregating module 219 segregates the predefined business logic into one or more processing divisions. In an embodiment, the predefined business logic is segregated by the segregating module 219 based on one or more actions to be performed on the one or more transactional data. As an example, the one or more actions may include, but not limited to, at least one of cleansing, validation, complex calculations, normalization, consolidation, grouping, filtering or conversion performed on the data related to one or more elements of the one or more tables. Upon segregating the predefined business logic into one or more processing divisions, the processor 109 assigns the one or more processing divisions to the RDBMS 107 and the noSQL database 108. In an embodiment, segregating and assigning some part of the one or more processing divisions to RDBMS 107 and remaining part to the noSQL database 108 is configurable. In an embodiment, the prompting module 221 prompts the noSQL database 108 to retrieve the one or more transactional data from the RDBMS 107. The noSQL database 108 may select only data related to one or more elements of one or more tables related to the one or more transactional data from the RDBMS 107 for retrieval. The RDBMS 107 performs the one or more actions associated with the one or more processing divisions assigned to the RDBMS 107 on the data related to the one or more elements of the one or more tables before retrieval by the noSQL database 108. The noSQL database 108 retrieves the data related to the one or more elements of the one or more tables on which the RDBMS 107 has performed the one or more actions, using a predefined Application Program Interface (API). As an example, the predefined API may be a REST API. Further, the noSQL database 108 transforms the retrieved data 209. The retrieved data 209 is transformed by performing the one or more actions associated with the one or more processing divisions assigned to the noSQL database 108. As an example, the transformation may include consolidation of the retrieved data, making the retrieved data presentable etc. Upon transforming the retrieved data 209, the transformed data 211 is sent to the database synchronization system 105.

In an embodiment, the receiving module 215 further receives the transformed data 211 from the noSQL database 108. As an example, consider the scenario as explained in FIG. 1. The transformation is done to the retrieved data for making the information presentable for user's understanding. The transformed data is as shown below:

Average salary of CS employees in Bangalore branch: Rs.40666.67.

Average salary of CS employees in Bangalore branch: Rs.55000.

Average salary of CS employees in Bangalore and Chennai branch: Rs.48857.14.

Total amount spent on salary of CS employees in Bangalore and Chennai branch: Rs.3, 42,000.

In an embodiment, the transmitting module 223 provides the transformed data 211 received from the noSQL database 108 to the user device 103. The transformed data 211 is finally provided to the user device 103 as a response to the user request received by the receiving module 215.

Figure 3:
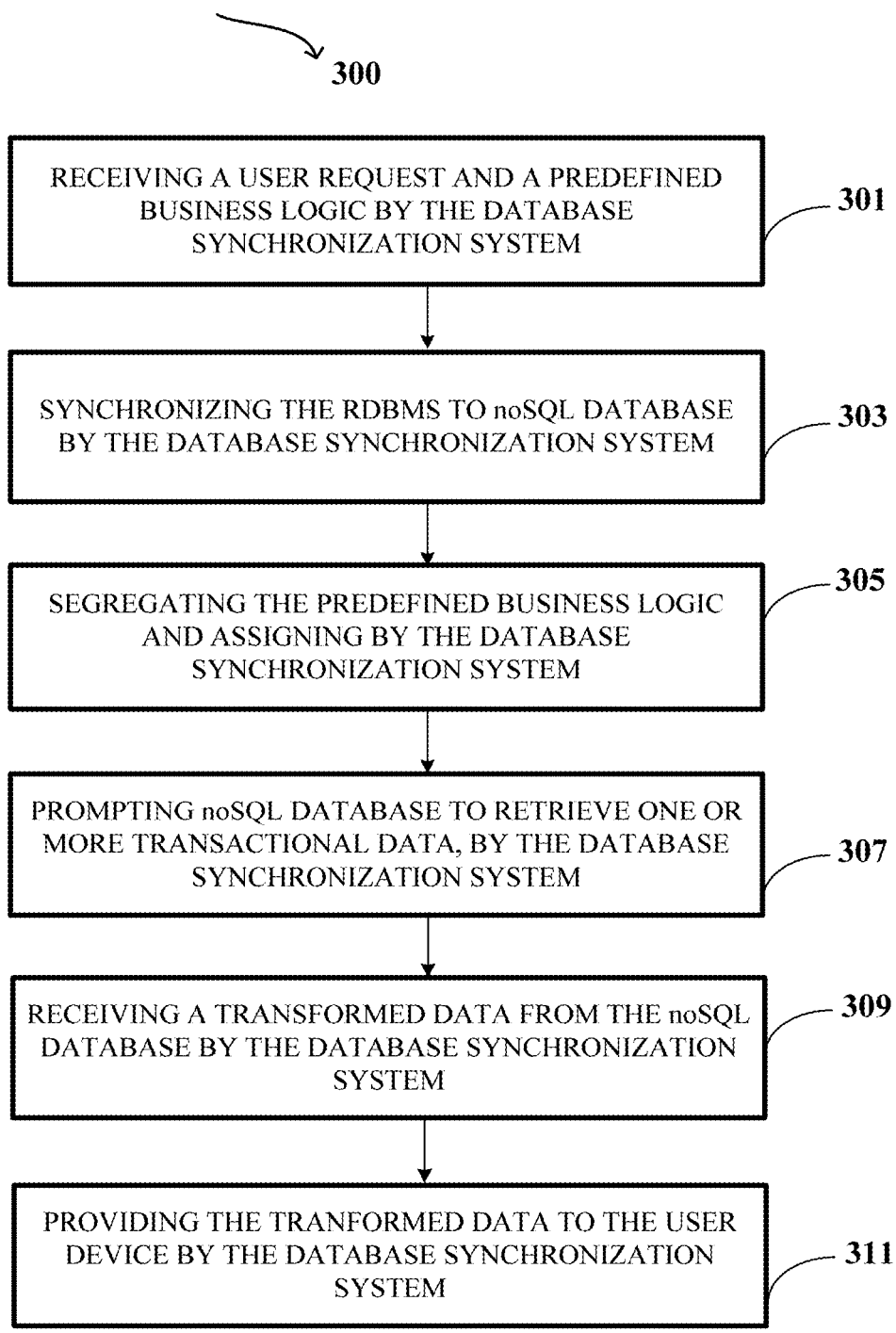
FIG. 3 illustrates a flowchart for synchronization of Relational Database Management System (RDBMS) to non-Structured Query Language (noSQL) database in accordance with some embodiments of the present disclosure.

FIG. 3 illustrates a flowchart for synchronization of Relational Database Management System (RDBMS) to non-Structured Query Language (noSQL) database in accordance with some embodiments of the present disclosure.

As illustrated in FIG. 3, the method 300 comprises one or more blocks illustrating a method for synchronization of Relational Database Management System (RDBMS) to non-Structured Query Language (noSQL) database. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the database synchronization system 105 receives a user request and predefined business logic. The user request comprises a request for retrieving one or more transactional data. In an embodiment, the user request sent from a user device 103 is associated with the predefined business logic. As an example, the user device 103 may include, but not limited to, a mobile, a laptop, a tablet and a desktop. An I/O interface 111 configured in the database synchronization system 105 receives the user request and the predefined business logic associated with the user request.

At block 303, the database synchronization system 105 synchronizes the RDBMS 107 to the noSQL database 108. The synchronization of the RDBMS 107 to the noSQL database 108 is based on the predefined business logic associated with the user request. Therefore, only a part of the RDBMS 107 associated with the predefined business logic is synchronized with the noSQL database 108 instead of complete synchronization. The synchronization of the RDBMS 107 to the noSQL database 108 may be performed at real time or the synchronization may be time bound.

At block 305, the database synchronization system 105 segregates the predefined business logic and assigns to the RDBMS 107 and the noSQL database 108. In an embodiment, the processor 109 segregates the predefined business logic into one or more processing divisions. The predefined business logic is segregated by the processor 109 based on one or more actions to be performed on the one or more transactional data. As an example, the one or more actions may include, but not limited to, at least one of cleansing, validation, complex calculations, normalization, consolidation, grouping, filtering or conversion performed on the data related to one or more elements of the one or more tables. Upon segregating the predefined business logic into one or more processing divisions, the processor 109 assigns the one or more processing divisions to the RDBMS 107 and the noSQL database 108. In an embodiment, segregating and assigning some part of the one or more processing divisions to RDBMS 107 and remaining part to the noSQL database 108 is configurable. As an example, the one or more processing divisions including the one or more actions like cleansing, complex calculations, validation and normalization may be assigned to the RDBMS 107 to eliminate the I/O overload through the communication network 104. As an example, the rest of the one or more processing divisions including the one or more actions like consolidating, grouping, filtering and conversion may be assigned to the noSQL database 108.

At block 307, the database synchronization system 105 prompts the noSQL database 108 to retrieve the one or more transactional data from the RDBMS 107. The noSQL database 108 may select only data related to one or more elements of one or more tables related to the one or more transactional data from the RDBMS 107 for retrieval. The RDBMS 107 performs the one or more actions associated with the one or more processing divisions assigned to the RDBMS 107 on the data related to the one or more elements of the one or more tables before retrieval by the noSQL database 108. The noSQL database 108 retrieves the data related to the one or more elements of the one or more tables on which the RDBMS 107 has performed the one or more actions, using a predefined Application Program Interface (API). As an example, the predefined API may be a REST API. At block 309, the database synchronization system 105 receives transformed data 211 from the noSQL database 108. In an embodiment, the noSQL database 108 transforms the data retrieved from the RDBMS 107, i.e. retrieved data 209. The noSQL database 108 transforms the retrieved data 209 by performing the one or more actions associated with the one or more processing divisions assigned to the noSQL database 108. Upon transforming the retrieved data 209, the transformed data 211 is sent to the database synchronization system 105 by the noSQL database 108. The I/O interface 111 receives the transformed data 211 from the noSQL database 108 upon performing the transformation.

At block 311, the database synchronization system 105 provides the transformed data 211 to the user device 103. In an embodiment, the I/O interface 111 provides the transformed data 211 to the user device 103 as a response to the user request received from the user device 103.

Figure 4:
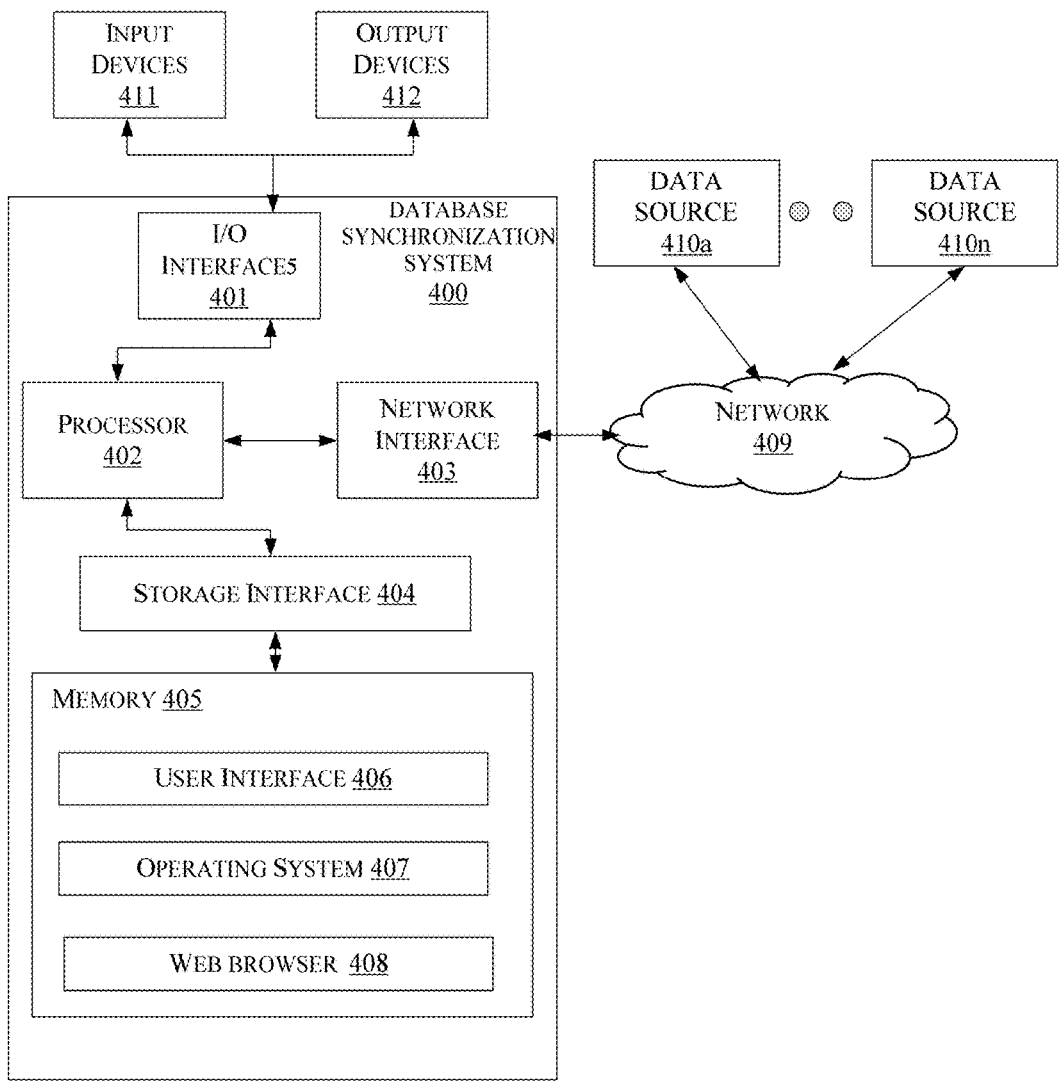
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the database synchronization system 400 is used for synchronization of Relational Database Management System (RDBMS) to non-Structured Query Language (noSQL) database. The database synchronization system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the database synchronization system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the database synchronization system 400 may communicate with one or more data sources 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more data sources 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, database synchronization system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the database synchronization system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the database synchronization system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the database synchronization system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the database synchronization system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the database synchronization system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

ADVANTAGES OF THE EMBODIMENT OF THE PRESENT DISCLOSURE ARE ILLUSTRATED HEREIN

In an embodiment, the present disclosure provides a method and a system for synchronization of Relational Database Management System (RDBMS) to non-Structured Query Language (noSQL) database.

The present disclosure works in combination with legacy applications. Therefore, adapting to the method provided in the present disclosure is safe and reliable.

The present disclosure provides a feature wherein the predefined business logic is segregated into one or more processing divisions based on one or more actions to be performed on the one or more elements retrieved from one or more tables. Therefore, the processing overhead and the workload are distributed among the RDBMS and the noSQL database leading to faster retrieval of data.

The present disclosure provides a feature wherein the user is in connection with only noSQL database through the database synchronization system. Therefore, when the noSQL database provides the one or more transactional data to the user device, Object-Relation Mapping (ORM) conversion is not required.

The present disclosure provides quick response and high speed data process for communicating with the hybrid database especially for the user devices using mobile based technology.

The present disclosure may be implemented in any current customer environment without changing or impacting their current production environment. The present disclosure can be implemented for all relational databases running on Z or distributed environment.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for synchronization of Relational Database Management System (RDBMS) to non-Structured Query Language (noSQL) database. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of synchronization of Relational Database Management System (RDBMS) to non-Structured Query Language (noSQL) database, the method comprising:
receiving, by a database synchronization system, a user request and an associated predefined business logic from a user device for retrieving one or more transactional data, wherein the one or more transactional data is stored in the RDBMS;
synchronizing, by the database synchronization system, a part of the RDBMS associated with the predefined business logic with the noSQL database;
segregating, by the database synchronization system, the predefined business logic into one or more processing divisions and assigning the one or more processing divisions to the RDBMS and the noSQL database, wherein the segregation is based on one or more actions to be performed;
prompting, by the database synchronization system, the noSQL database to retrieve data related to one or more elements of one or more tables related to the one or more transactional data from the RDBMS, wherein the RDBMS performs the one or more actions associated with the one or more processing divisions assigned to the RDBMS on the data related to the one or more elements of the one or more tables;
receiving, by the database synchronization system, a transformed data from the noSQL database, wherein the transformed data is formed by the noSQL database by performing the one or more actions associated with the one or more processing divisions assigned to the noSQL database on the retrieved data related to the one or more elements of the one or more tables; and providing, by the database synchronization system, the transformed data to the user device.

2. The method as claimed in claim 1, wherein the one or more actions are at least one of cleansing, validation, complex calculations, normalization, consolidation, grouping, filtering or conversion performed on the data related to one or more elements of the one or more tables.

3. The method as claimed in claim 1 further comprises capturing, by the database synchronization system, one or more changes made to the data related to the one or more elements of the one or more tables at real time.

4. The method as claimed in claim 1, wherein the transformed data is provided to the user device without performing Object-Relation Mapping (ORM) conversion.

5. The method as claimed in claim 1, wherein the synchronization of the RDBMS to the noSQL database is at least one of time bound or performed at real-time.

6. A database synchronization system for synchronization of Relational Database Management System (RDBMS) to non-Structured Query Language (noSQL) database, the database synchronization system comprising:
  a processor; and
  a memory communicatively coupled to the processor, wherein the memory stores the processor-executable instructions, which, on execution, causes the processor to:
    receive a user request and an associated predefined business logic from a user device for retrieving one or more transactional data, wherein the one or more transactional data is stored in the RDBMS;
    synchronize a part of the RDBMS associated with the predefined business logic with the noSQL database;
    segregate the predefined business logic into one or more processing divisions and assigning the one or more processing divisions to the RDBMS and the noSQL database, wherein the segregation is based on one or more actions to be performed on the one or more transactional data;
    prompt the noSQL database to retrieve data related to one or more elements of one or more tables related to the one or more transactional data from the RDBMS, wherein the RDBMS performs the one or more actions associated with the one or more processing divisions assigned to the RDBMS on the data related to the one or more elements of the one or more tables;
    receive a transformed data from the noSQL database, wherein the transformed data is formed by the noSQL database by performing the one or more actions associated with the one or more processing divisions assigned to the noSQL database on the retrieved data related to the one or more elements of the one or more tables; and
    provide the transformed data to the user device.

7. The database synchronization system as claimed in claim 6, wherein the one or more actions are at least one of cleansing, validation, complex calculations, normalization, consolidation, grouping, filtering or conversion performed on the data related to one or more elements of the one or more tables.

8. The database synchronization system as claimed in claim 6, wherein the processor is further configured to capture one or more changes made to the data related to the one or more elements of the one or more tables at real time.

9. The database synchronization system as claimed in claim 6, wherein the processor provides the transformed data to the user device without performing Object-Relation Mapping (ORM) conversion.

10. The database synchronization system as claimed in claim 6, wherein the synchronization of the RDBMS to the noSQL database is at least one of time bound or performed at real-time.

11. A non-transitory computer readable medium including instructions stored thereon that when processed by at least one processor causes a database synchronization system to perform operations comprising:
  receiving a user request and an associated predefined business logic from a user device for retrieving one or more transactional data, wherein the one or more transactional data is stored in the RDBMS;
  synchronizing a part of the RDBMS associated with the predefined business logic with the noSQL database;
  segregating the predefined business logic into one or more processing divisions and assigning the one or more processing divisions to the RDBMS and the noSQL database, wherein the segregation is based on one or more actions to be performed;
  prompting the noSQL database to retrieve data related to one or more elements of one or more tables related to the one or more transactional data from the RDBMS, wherein the RDBMS performs the one or more actions associated with the one or more processing divisions assigned to the RDBMS on the data related to the one or more elements of the one or more tables;
  receiving a transformed data from the noSQL database, wherein the transformed data is formed by the noSQL database by performing the one or more actions associated with the one or more processing divisions assigned to the noSQL database on the retrieved data related to the one or more elements of the one or more tables; and
  providing the transformed data to the user device.

12. The medium as claimed in claim 11, wherein the one or more actions are at least one of cleansing, validation, complex calculations, normalization, consolidation, grouping, filtering or conversion performed on the data related to one or more elements of the one or more tables.

13. The medium as claimed in claim 11, wherein the instructions further cause the processor to capture one or more changes made to the data related to the one or more elements of the one or more tables at real time.

14. The medium as claimed in claim 11, wherein the instructions cause the processor to provide the transformed data to the user device without performing Object-Relation Mapping (ORM) conversion.

15. The medium as claimed in claim 11, wherein the synchronization of the RDBMS to the noSQL database is at least one of time bound or performed at real-time.

* * * * *